Aug. 30, 1960     F. ABDELA     2,950,532

MEANS FOR CUTTING PLASTIC SUBSTANCES

Filed Sept. 4, 1958

FREDERICK ABDELA
INVENTOR
by Irwin S. Thompson
ATTORNEY

United States Patent Office 2,950,532
Patented Aug. 30, 1960

2,950,532

MEANS FOR CUTTING PLASTIC SUBSTANCES

Frederick Abdela, London, England, assignor to Moo-Cow Group Limited, London, England, a British company Filed Sept. 4, 1958, Ser. No. 758,987

4 Claims. (Cl. 31—7)

This invention relates to means for cutting plastic substances and more particularly but not solely to means for cutting butter and margarine into rectangular shaped pats.

It has been proposed to use various devices for producing pats of butter but they are either too slow for making large quantities quickly or are subject to other disadvantages. For example, an apparatus has been proposed having a rotatable handle producing one pat per revolution. This however is rather tedious to operate and it has been found that careless operators will catch the pats in the hand use the fingers to place the pats in rows on a sheet of paper. This handling of pats is, of course, very objectionable.

According to the present invention we provide a shallow slotted or grooved rectangular frame in which the butter or other substance can be spread, and a cutter formed by a series of axially spaced discs which are guided by the frame and received into the slots or grooves at the end of each cut to ensure severing the last marginal part of the substance, the slots or grooves in two opposite sides of the frame being disposed in a transverse direction to the direction of the slots or grooves in the other two opposite sides.

Figure 1:
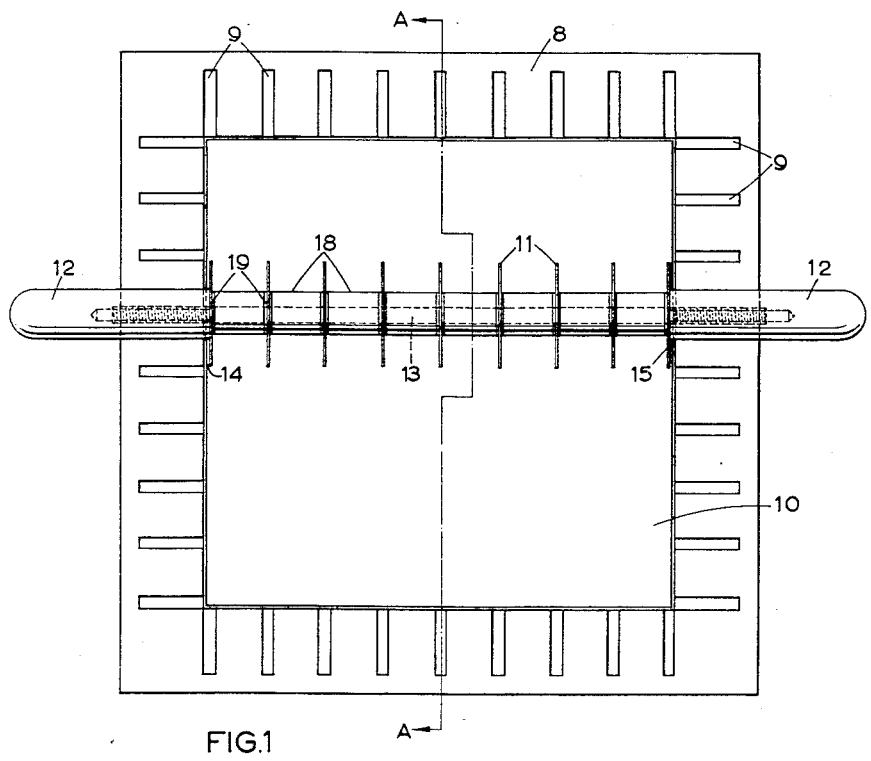
Figure 2:
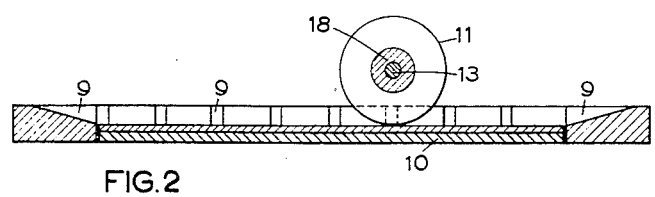

A constructional form of the invention will now be described with reference to the accompanying drawing wherein:

Figure 1 is a plan view of the invention showing a cutter together with a square frame for receiving butter or the like; and Figure 2 is a sectional view taken on the line A—A in Figure 1.

The frame 8 is square with slots 9 in each of the four sides and having a loose platen 10 fitting closely within the frame and of less depth than the frame so as to leave a square recess which can be filled with butter or the like to the depth required for the thickness of the pats. Each side of the frame 8 is flat and equal to the depth of the platen plus the required depth of the pats. The platen is formed of two sheets of material the upper layer being a synthetic plastic composition and the lower being wood.

Each side has the slots 9 cut in its upper surface extending from the inside edge where they are of maximum depth, e.g. extending nearly or completely through the depth of the side but preferably to a depth level with the upper surface of the platen, to about half way across the upper surface of the side with gradually diminishing depth towards the outside edge. The slots are at right angles to the length of the side and the end slots have their outer edges in line with the inside surfaces of the adjacent sides of the frame. The slots are about one sixteenth to three sixteenths of an inch wide.

For cutting the butter we provide a cutter comprising a series of discs 11 fixed at equal distances apart on a rod 13 which is provided with handles 12 like a rolling pin which handles are secured internally and engage threaded portions on the ends of the rod. The discs are spaced apart by means of spacers 18 and washers 19 so as to enter the slots provided in the frame 8. The end discs 14, 15 are spaced apart to engage with slight clearance between the inner surfaces of each pair of opposite sides of the frame so that the cutter is guided by these inner surfaces as it is rolled over the butter.

The discs 11 have a uniform thickness and are made from plate steel, the spacers and handles are made from a synthetic resinous composition.

The cutter may alternatively be turned from a single piece of wood, in which case the discs are formed having increasing thickness from their outer peripheries towards their axes. The two end discs have their outer surfaces formed at right angles to the axis of the cutter so as to engage with slight clearance the inner surfaces of each pair of opposite sides of the frame so that the cutter is guided by these inner surfaces.

Preferably the discs at or near their outer peripheries (within the thickness of the butter or the like in the frame) are from one to three sixteenths of an inch in thickness so as to provide an effective separation of the pats.

The cutter and frame may be made from wood or metal or any other suitable material.

In operation a quantity of butter or the like at normal kitchen temperature is placed on the platen and spread with a large flat blade or knife to fill the recess in the frame level with the upper surface of the frame. The cutter is then rolled over the butter first in one direction then in a direction at right angles thereto with the discs in rolling contact with the platen through the butter so as to cut it into square pats without waste. The platen may then be removed with the pats and placed in a refrigerator until they harden whereupon they can easily be removed by knocking the platen on a table or basin.

I claim:

1. Means for cutting plastic substances comprising a shallow square frame with a flat bottom so that a plastic substance can be spread within the frame, said frame having grooves in each of the four sides thereof, each side of the frame having a series of said grooves therein which are transverse to the length of the side and in line with the grooves in the opposite side of the frame, and a roller cutter in rolling contact with said bottom formed by a series of axially spaced cutting discs which are received into the grooves at the beginning and end of each cut to ensure severing the marginal parts of the substance, the end discs being in engagement with the opposite inside edges of the frame and guided thereby in each of the two directions of cutting so as to cut said substance into small squares.

2. Means as claimed in claim 1, wherein the frame is provided with a loose platen fitting closely within the frame, which is of less depth than the frame.

3. Means as claimed in claim 1, wherein the frame is provided with a loose platen which is approximately one half the depth of the frame in order to provide a recess into which the substance can be spread.

4. Means as claimed in claim 1, wherein the slots are cut in the upper surface of each side of the frame and extend from the inside edge of each side where they are of maximum depth which depth continues to about half way across the upper surface of the side and the slots are then of diminishing depth towards the outside edge.

References Cited in the file of this patent

UNITED STATES PATENTS

| 359,480 | Weber | Mar. 15, 1887 |
| 693,760 | Walker | Feb. 18, 1902 |
| 890,351 | Frank | June 9, 1908 |

FOREIGN PATENTS

| 4,869 | Great Britain | Nov. 28, 1879 |